(12) United States Patent
Abe

(10) Patent No.: US 8,665,490 B2
(45) Date of Patent: Mar. 4, 2014

(54) INFORMATION PROCESSING APPARATUS, DISPLAY METHOD THEREFOR, AND COMPUTER-READABLE STORAGE MEDIUM

(75) Inventor: Masahiro Abe, Yamato (JP)

(73) Assignee: Canon Kabushiki Kaisha, Tokyo (JP)

( * ) Notice: Subject to any disclaimer, the term of this patent is extended or adjusted under 35 U.S.C. 154(b) by 622 days.

(21) Appl. No.: 12/563,270

(22) Filed: Sep. 21, 2009

(65) Prior Publication Data

US 2010/0079777 A1 Apr. 1, 2010

(30) Foreign Application Priority Data

Oct. 1, 2008 (JP) ................................ 2008-256643

(51) Int. Cl.
*G06K 15/00* (2006.01)
*H04N 1/60* (2006.01)
*H04N 5/262* (2006.01)
*G06K 9/20* (2006.01)

(52) U.S. Cl.
USPC ........... 358/1.9; 358/1.18; 715/274; 715/783; 705/26.5; 348/240.2; 382/283

(58) Field of Classification Search
USPC ................... 358/1.15, 1.9, 1.14, 2.1; 382/283
See application file for complete search history.

(56) References Cited

U.S. PATENT DOCUMENTS

| | | | | |
|---|---|---|---|---|
| 6,587,596 | B1 * | 7/2003 | Haeberli | 382/283 |
| 6,774,364 | B2 * | 8/2004 | Takagi | 250/310 |
| 6,941,276 | B2 * | 9/2005 | Haeberli | 705/26.5 |
| 7,395,229 | B2 * | 7/2008 | Haeberli | 705/26.5 |
| 7,573,514 | B2 * | 8/2009 | Pasquarette et al. | 348/240.2 |
| 7,612,913 | B2 * | 11/2009 | Matsuzaki et al. | 358/1.9 |
| 7,821,690 | B2 | 10/2010 | Yamada et al. | 358/257 |
| 2005/0227154 | A1 * | 10/2005 | Motoki | 430/22 |
| 2009/0300540 | A1 * | 12/2009 | Russell | 715/783 |

FOREIGN PATENT DOCUMENTS

| | | | |
|---|---|---|---|
| JP | 8-292018 | 11/1995 | |
| JP | 2001-285627 | 10/2001 | ............ H04N 1/393 |
| JP | 2004-046836 | 2/2004 | |
| JP | 2004-240200 | 8/2004 | |
| JP | 2005-296091 | 10/2005 | |
| JP | 2006-277056 | 10/2006 | |
| JP | 2007-044239 | 2/2007 | |

OTHER PUBLICATIONS

Office Action issued by JPO on Dec. 7, 2012, in counterpart Japanese patent application 2008-256643, with translation.

* cited by examiner

*Primary Examiner* — Akwasi M Sarpong
(74) *Attorney, Agent, or Firm* — Fitzpatrick, Cella, Harper & Scinto

(57) ABSTRACT

An information processing apparatus sets, on an image to be printed, the print position of attribute information of the image. The information processing apparatus displays, on a display device, the print preview screen of the image to be printed in which an image forming the attribute information is arranged at the set print position. When a region corresponding to the attribute information on the print preview screen displayed on the display device is selected, the information processing apparatus enlarges and displays the attribute information.

8 Claims, 10 Drawing Sheets

FIG. 3B

ANNOTATION ITEMS  503

SELECT ITEMS TO BE PRINTED.  504

☑ PATIENT ID
☑ PATIENT NAME
☑ DATE OF BIRTH
☑ SEX
☑ AGE
☐ EXAMINATION DATE
☐ EXAMINATION NUMBER
☐ SERIES NUMBER
☐ IMAGE NUMBER
☐ DESCRIPTION OF EXAMINATION
☐ EXAMINATION TIME
☐ FILE NAME
☐ PART
☐ LINE-OF-SIGHT DIRECTION
☐ IMAGE DIAGNOSTICIAN NAME
☐ REFERRING PHYSICIAN NAME
☐ TECHNICIAN NAME
☐ FACILITY NAME

OK   CANCEL

505

F I G. 7
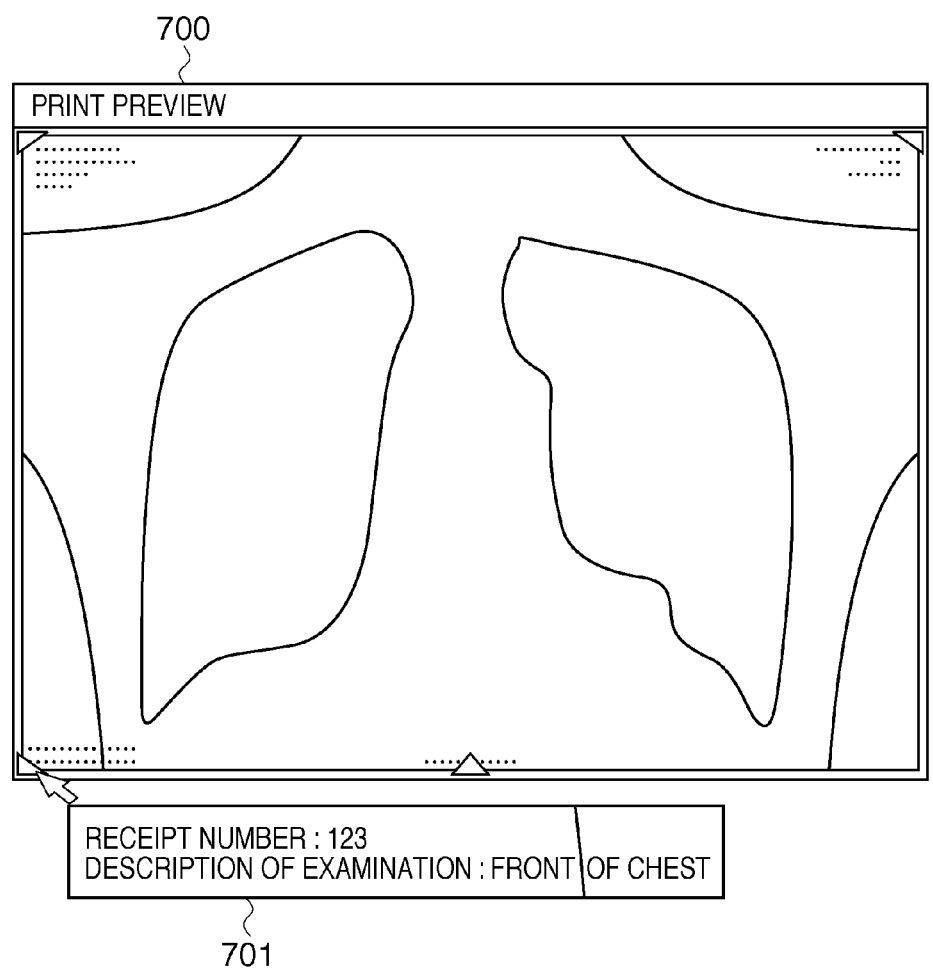

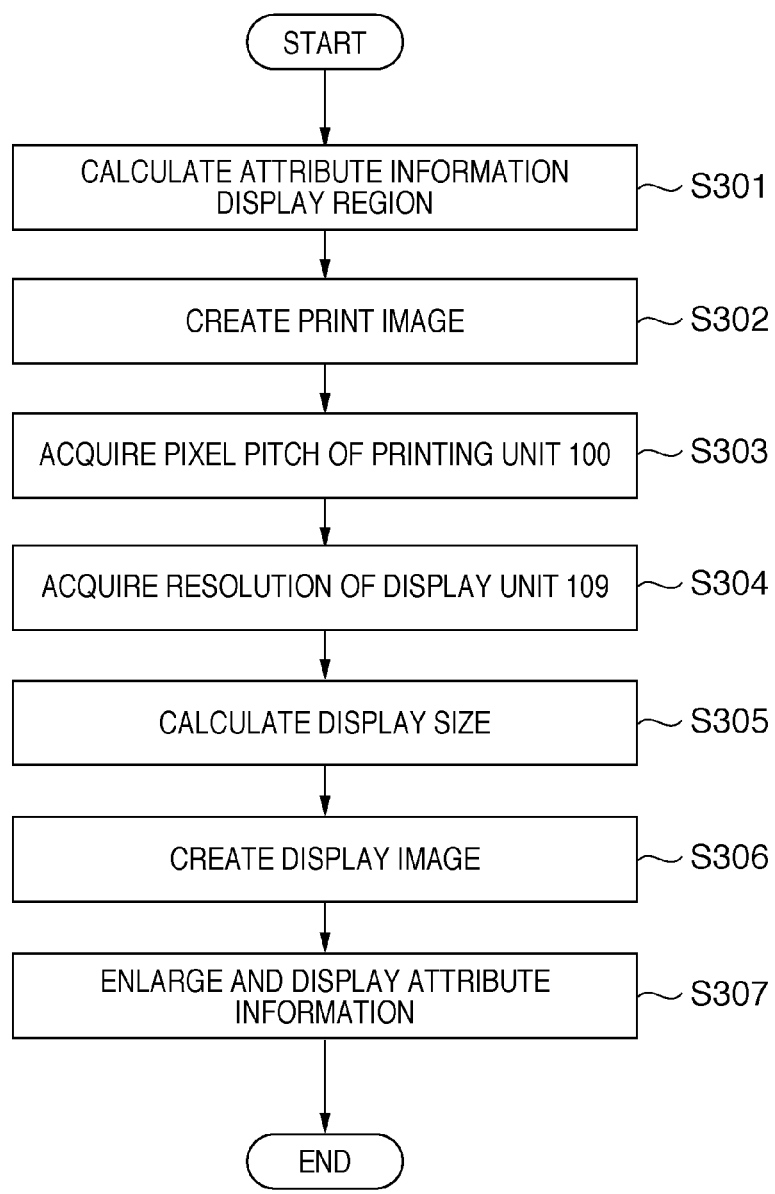

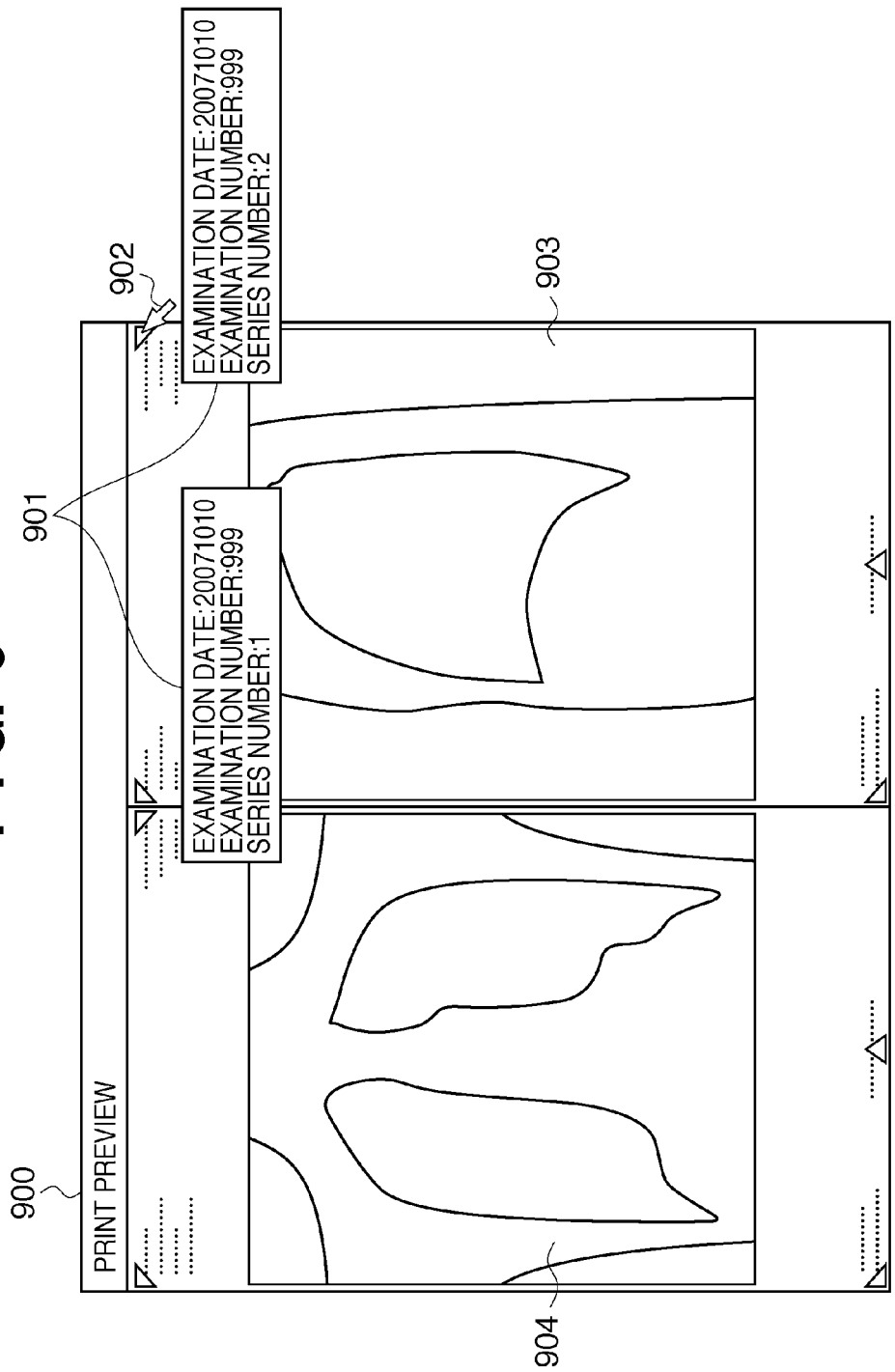

INFORMATION PROCESSING APPARATUS, DISPLAY METHOD THEREFOR, AND COMPUTER-READABLE STORAGE MEDIUM

BACKGROUND OF THE INVENTION

1. Field of the Invention

The present invention relates to an information processing apparatus, display method therefor, and computer-readable storage medium.

2. Description of the Related Art

Recently, in the medical field, various diagnostic apparatuses are connected to a computer to enable monitor diagnosis. In the monitor diagnosis, images obtained using these diagnostic apparatuses are displayed on a monitor such as a CRT (Cathode Ray Tube) or liquid crystal display to make a diagnosis by referring to the display. While the monitor diagnosis is prevailing, film output is still used. An image-dedicated printer (DICOM printer) often outputs a film.

A system with a print function generally has a function of previewing a print result to prompt a user to confirm whether he is satisfied with the print result (see Japanese Patent Laid-Open No. 2001-285627). For example, in the medical field, attribute information including the patient ID and examination date is often printed on a film. The user needs to confirm the attribute information in addition to a medical image.

In general, the resolution of a medical image is high. In a preview of an entire film image, attribute information is displayed to be small, greatly impairing visibility. In this case, the user generally enlarges the previewed image to confirm the attribute information (text). However, the user needs to repetitively enlarge the image for confirmation of attribute information, move it, and cancel the enlargement. This impairs operability and user friendliness.

SUMMARY OF THE INVENTION

The present invention provides a technique for providing a display which allows an operator to easily confirm the contents of attribute information added to an image, together with the print image of the entire image (high resolution).

According to a first aspect of the present invention, there is provided an information processing apparatus which displays various screens on a display device, the apparatus comprising: a setting unit configured to set, on an image to be printed, a print position of attribute information of the image; a preview display processing unit configured to display, on the display device, a print preview screen of the image to be printed in which an image forming the attribute information is arranged at the print position; and an attribute information display processing unit configured to enlarge and display the attribute information when a region corresponding to the attribute information on the print preview screen displayed on the display device is selected.

According to a second aspect of the present invention, there is provided a display method for an information processing apparatus which displays various screens on a display device, the method comprising: setting, on an image to be printed, a print position of attribute information of the image; displaying, on the display device, a print preview screen of the image to be printed in which an image forming the attribute information is arranged at the print position; and enlarging and displaying the attribute information when a region corresponding to the attribute information on the print preview screen displayed on the display device is selected.

According to a third aspect of the present invention, there is provided a computer-readable storage medium storing a computer program for causing a computer incorporated in an information processing apparatus which displays various screens on a display device, to function as a setting unit configured to set, on an image to be printed, a print position of attribute information of the image, a preview display processing unit configured to display, on the display device, a print preview screen of the image to be printed in which an image forming the attribute information is arranged at the print position, and an attribute information display processing unit configured to enlarge and display the attribute information when a region corresponding to the attribute information on the print preview screen displayed on the display device is selected.

Further features of the present invention will be apparent from the following description of exemplary embodiments with reference to the attached drawings.

BRIEF DESCRIPTION OF THE DRAWINGS

FIGS. 3A and 3B are views exemplifying a screen displayed when making an attribute information print setting;

FIG. 7 is a view exemplifying a print preview screen according to the second embodiment;

FIG. 8 is a flowchart exemplifying the sequence of display size determination processing when displaying attribute information; and FIG. 9 is a view exemplifying a print preview screen according to the third embodiment.

DESCRIPTION OF THE EMBODIMENTS

Preferred embodiments of the present invention will now be described in detail with reference to the drawings. It should be noted that the relative arrangement of the components, the numerical expressions and the numerical values set forth in these embodiments do not limit the scope of the present invention unless it is specifically stated otherwise. The following embodiments will exemplify a case in which an image to be printed is a medical X-ray image and the image is printed on a film. The present invention is also applicable to other types of image or other types of printing media.

(First Embodiment)

Figure 1:
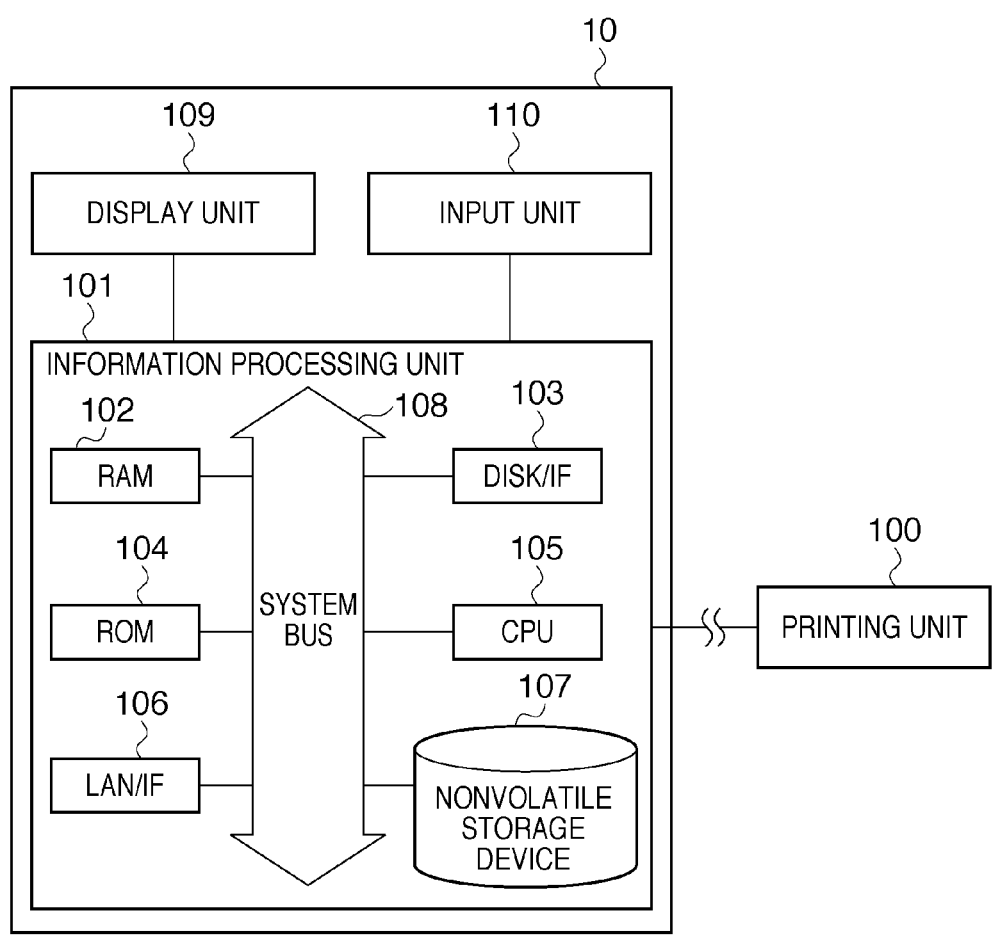
FIG. 1 is a block diagram exemplifying the functional arrangement of an information processing apparatus 10 according to an embodiment of the present invention.

FIG. 1 is a block diagram exemplifying the functional arrangement of an information processing apparatus 10 according to the first embodiment of the present invention.

The information processing apparatus 10 includes an information processing unit 101, display unit 109, input unit 110, and printing unit 100.

The information processing unit 101 has a general computer configuration. More specifically, the information processing unit 101 includes a RAM 102, DISK/IF 103, ROM 104, CPU 105, LAN/IF 106, and nonvolatile storage device 107 such as a hard disk. These building components of the information processing unit 101 are connected by a system bus 108 to be communicable with each other. The information processing unit 101 manages images and attribute information accessory to them by using a database or the like. As described above, an image processed in the embodiment is a medical X-ray image, so the image has a resolution higher than a general image.

The input unit 110 includes a mouse and keyboard, and inputs various commands and data from the operator into the information processing unit 101. The display unit 109 is a display device formed from a CRT (Cathode Ray Tube), liquid crystal display, or the like, and displays a variety of screens such as an image and GUI (Graphical User Interface). The display unit 109 is arbitrarily implemented inside or outside the information processing apparatus 10.

The printing unit 100 prints based on an image sent from the information processing unit 101. The connection configuration between the printing unit 100 and the information processing apparatus 10 is arbitrarily a wired or wireless connection. The printing unit 100 and information processing apparatus 10 can use any communication protocol as long as they can exchange data.

Figure 2:
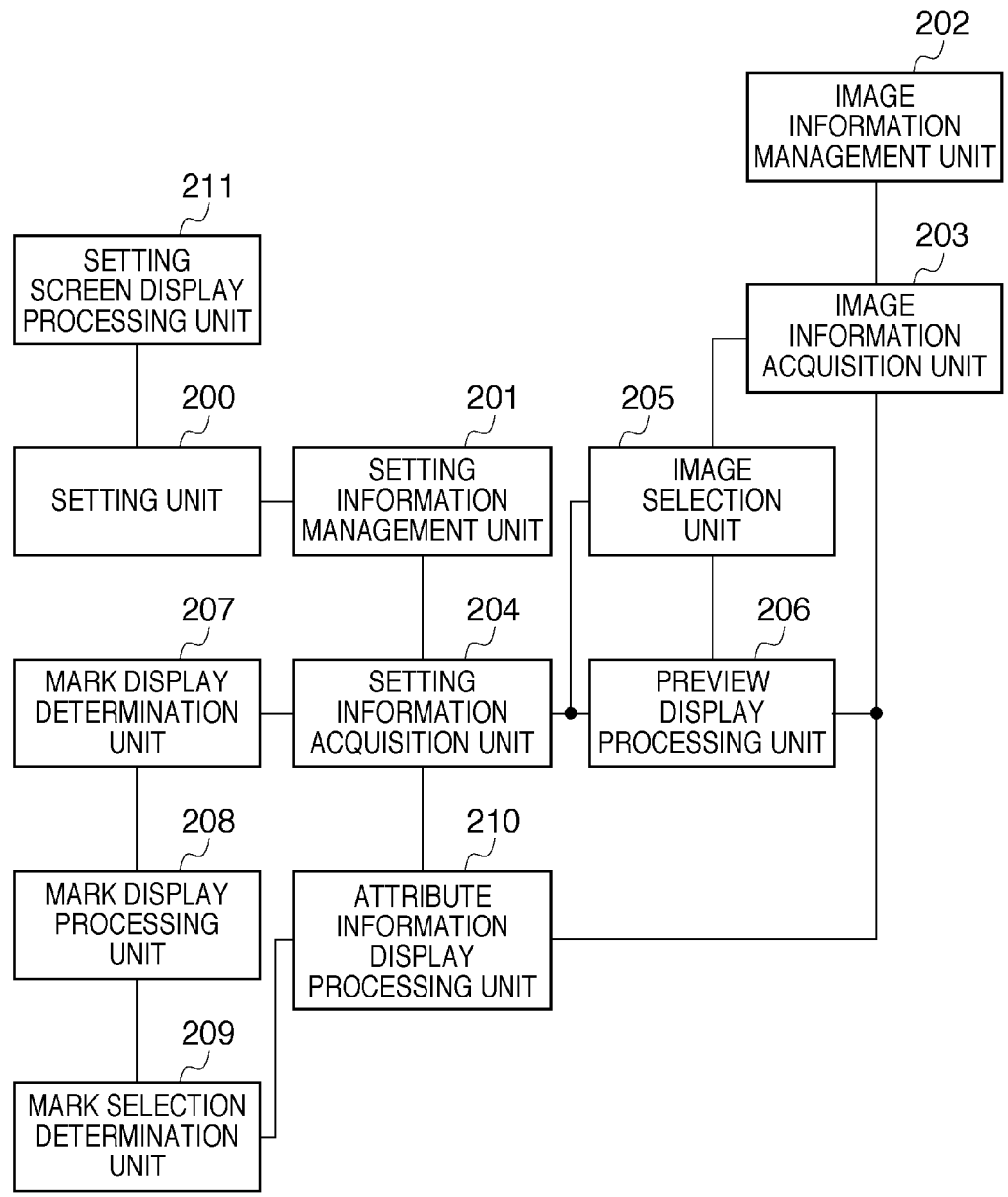
FIG. 2 is a block diagram exemplifying the functional arrangement of an information processing unit 101 shown in FIG. 1.

An example of the functional arrangement of the information processing unit 101 shown in FIG. 1 will be explained with reference to FIG. 2. The functional arrangement of the information processing unit 101 is obtained mainly when the CPU 105 reads out a program from the ROM 104 or nonvolatile storage device 107 and executes it using the RAM 102 as a work area.

The information processing unit 101 includes, as the functional arrangement, a setting screen display processing unit 211, setting unit 200, setting information management unit 201, image information management unit 202, image information acquisition unit 203, setting information acquisition unit 204, image selection unit 205, a preview display processing unit 206, mark display determination unit 207, mark display processing unit 208, mark selection determination unit 209, and attribute information display processing unit 210.

The setting screen display processing unit 211 displays a screen on the display unit 109 to prompt the operator to select an item to be printed among attribute information items such as the patient ID and examination date when outputting an image on a film. On this screen, the operator also selects the print position, size, and the like of the attribute information.

The setting unit 200 sets attribute information. More specifically, the setting unit 200 sets setting information of attribute information based on an instruction from the operator who sees a screen displayed by the setting screen display processing unit 211. Note that the operator inputs an instruction into the apparatus via the input unit 110.

By using a database or the like, the setting information management unit 201 manages setting information of attribute information set by the setting unit 200. The setting information acquisition unit 204 acquires setting information of attribute information from the setting information management unit 201. The image selection unit 205 selects an image to be printed. The image selection unit 205 selects an image based on an instruction from the operator via the input unit 110.

The image information management unit 202 manages an image and attribute information accessory to it, including the patient ID and examination date. The image information acquisition unit 203 acquires an image and attribute information from the image information management unit 202.

The preview display processing unit 206 arranges, on an image selected by the image selection unit 205, attribute information associated with the image, and displays the resultant image as a print preview screen on the display unit 109. The attribute information is arranged based on setting information set by the setting unit 200. The print preview screen is a screen for previewing an actual print result.

The mark display determination unit 207 determines whether to display a mark. Based on the determination result, the mark display processing unit 208 displays a mark on the display unit 109. The mark represents the presence/absence of attribute information, and is added in correspondence with a region where the attribute information is displayed.

The mark selection determination unit 209 determines whether a mark displayed on the display unit 109 is selected. The displayed mark is selected by, for example, a mouse operation by the operator via the input unit 110.

The attribute information display processing unit 210, for example, enlarges and displays attribute information displayed on the display unit 109 so that the operator can see it. The attribute information is displayed based on the determination result of the mark selection determination unit 209. For example, when the mark selection determination unit 209 determines that a mark is selected, the attribute information display processing unit 210 enlarges and displays attribute information in a region corresponding to the mark by using a separate window or the like.

An example of the operation of the information processing apparatus 10 shown in FIG. 1 will be described.

Figure 3A:
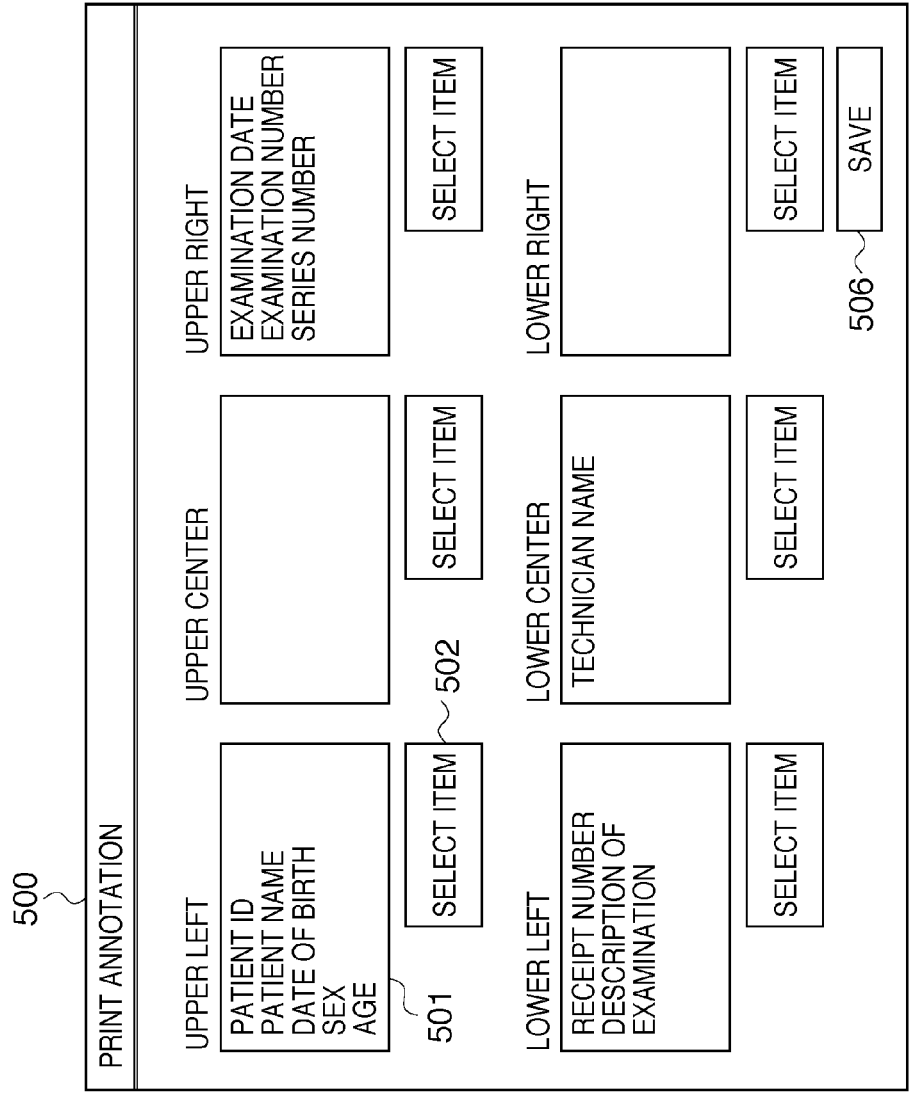

Processing when making an attribute information print setting will be explained. FIGS. 3A and 3B exemplify a screen displayed when making an attribute information print setting.

An attribute information print setting is made on screens 500 and 503. On the screen 500, attribute information to be printed is selected in each of regions (upper left, upper center, upper right, lower left, lower center, and lower right) on an image. Each list display region 501 displays an attribute information list. For example, in the list display region 501 arranged in correspondence with the upper left region, the patient ID, patient name, date of birth, sex, and age are selected as attribute information items to be printed. When this image is printed, these attribute information items are printed in the upper left region. The screen 500 has list display regions in correspondence with the respective regions (upper left, upper center, upper right, lower left, lower center, and lower right).

Each item selection button 502 is pressed to select an attribute information item to be printed. When the operator presses this button with a mouse or the like, the screen 503 appears.

The screen 503 displays a list of attribute information items. The operator checks a check box arranged in correspondence with each item to select attribute information to be printed. When the operator presses an OK button 505 after the selection, the screen 503 disappears, and the screen 500 is updated in accordance with an item selected on the screen 503.

Figure 4:
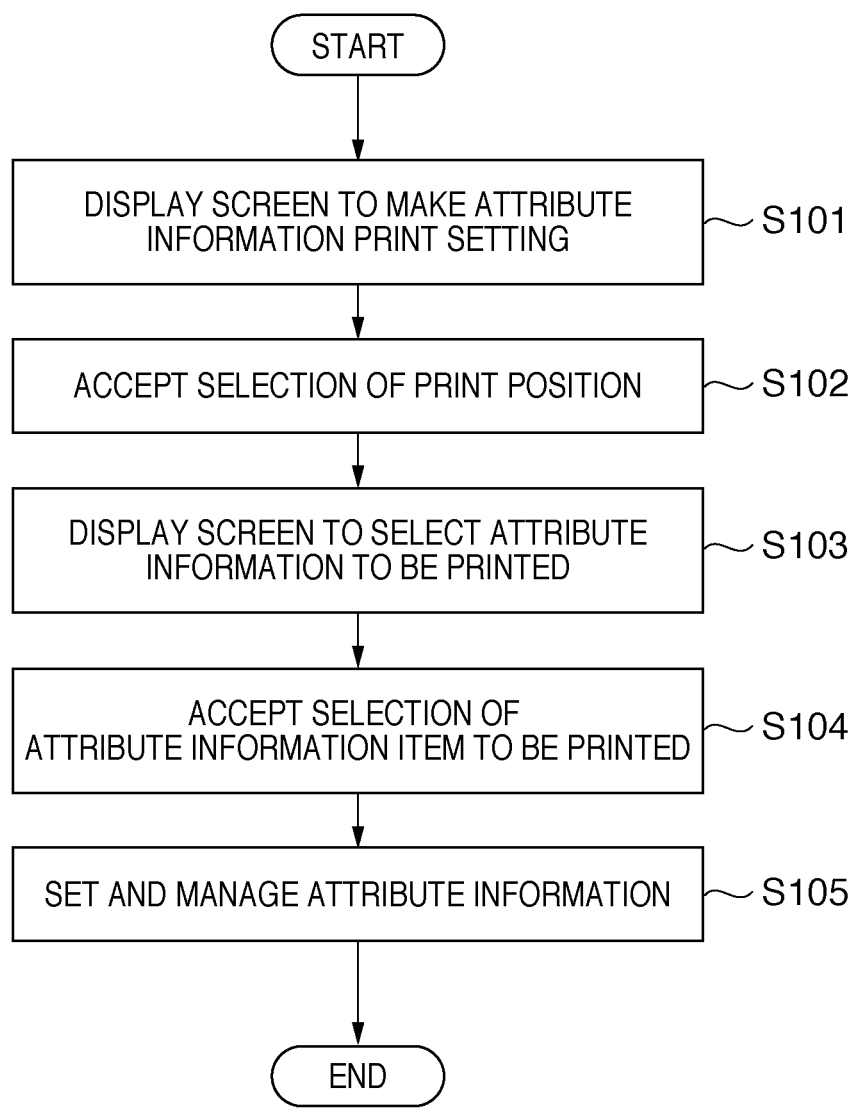
FIG. 4 is a flowchart exemplifying the sequence of processing when making an attribute information print setting.

FIG. 4 is a flowchart exemplifying the sequence of processing when making an attribute information print setting.

The information processing apparatus 10 causes the setting screen display processing unit 211 to display a screen for making an attribute information print setting (S101). More specifically, the display unit 109 displays the screen 500 shown in FIG. 3A. Assume that an attribute information print position is selected by an operation (e.g., mouse) by the operator (the item selection button 502 is pressed). Then, the information processing apparatus 10 accepts the input operation (S102), and causes the setting screen display processing unit 211 to display a screen for selecting attribute information to be printed (S103). More specifically, the display unit 109 displays the screen 503 shown in FIG. 3B.

If attribute information is then selected by an operation (e.g., mouse) by the operator (S104), the information processing apparatus 10 accepts the instruction and causes the setting unit 200 to set setting information of attribute information based on the instruction. As described above, the setting information management unit 201 manages the setting information (S105).

Figure 5:
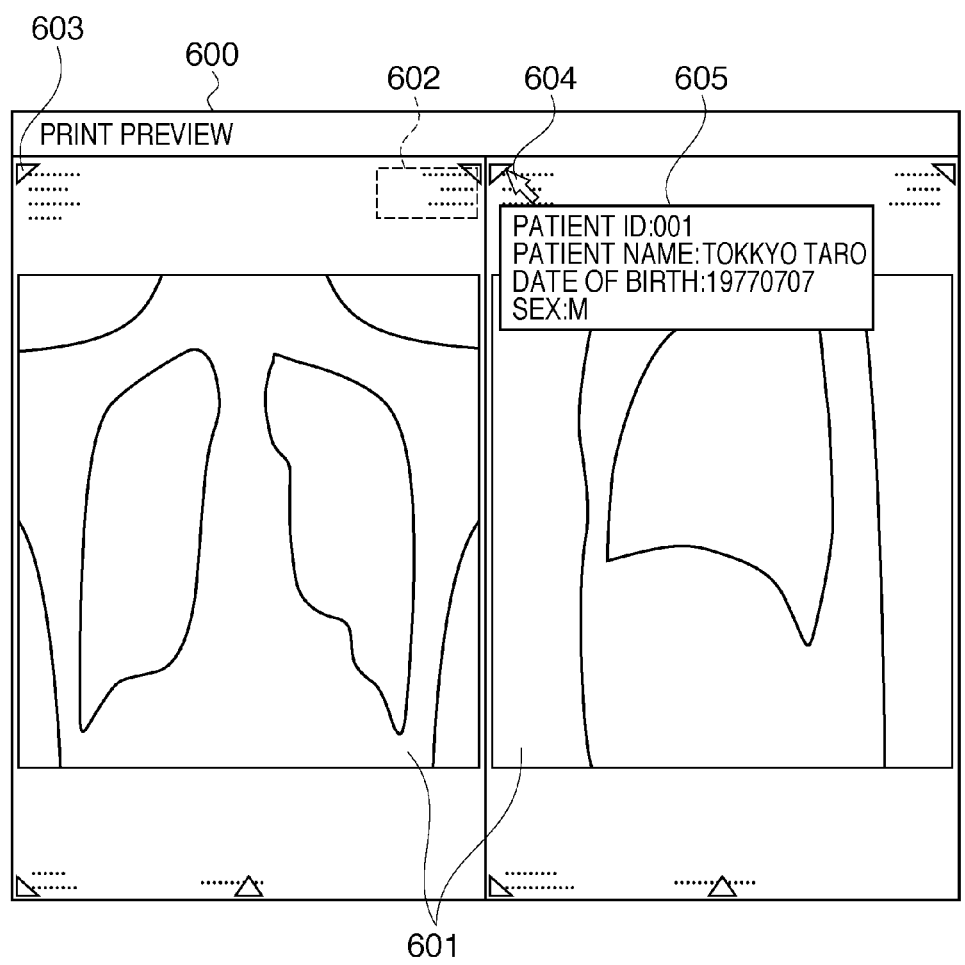
FIG. 5 is a view exemplifying a print preview screen.

Processing when displaying a print preview screen will be described. FIG. 5 is a view exemplifying a print preview screen displayed based on settings in FIGS. 3A and 3B.

A screen 600 for displaying a print preview displays the print result of actual printing. On the print preview screen, attribute information is added to each image 601 to be printed. The attribute information is added based on setting information of the attribute information that is set in advance.

On the print preview screen shown in FIG. 5, two images 601 are selected. A rectangular region 602 of a broken line represents the display state of attribute information on a film. The attribute information displayed on the preview is in a display state upon actual printing. Thus, letters are excessively small, and it is difficult to confirm the contents of the attribute information.

To solve this, according to the first embodiment, a mark 603 is displayed at a position where an attribute information display item exists. When the operator selects the mark with a mouse or the like, attribute information present in a corresponding region is displayed so that he can see it.

The mark display processing unit 208 displays the mark 603. The mark appears at a position where an attribute information display item exists. FIG. 5 shows a print preview screen displayed based on settings in FIGS. 3A and 3B. Thus, marks are displayed at a total of four, upper left, upper right, lower left, and lower center portions of each image.

A mouse cursor 604 is moved or clicked in accordance with a mouse operation by the operator. The attribute information display processing unit 210 displays attribute information 605. When the operator points the mouse cursor 604 to the position of each mark 603, the window of the attribute information 605 appears to enlarge and display the attribute information. More specifically, pointing the mouse cursor 604 to the position of the mark 603 is determined as selection of the mark, and the attribute information is enlarged and displayed. Note that the attribute information may be enlarged and displayed at a preset font size or the default font size of the OS. The font size is arbitrary as long as the operator can see the attribute information.

Figure 6:
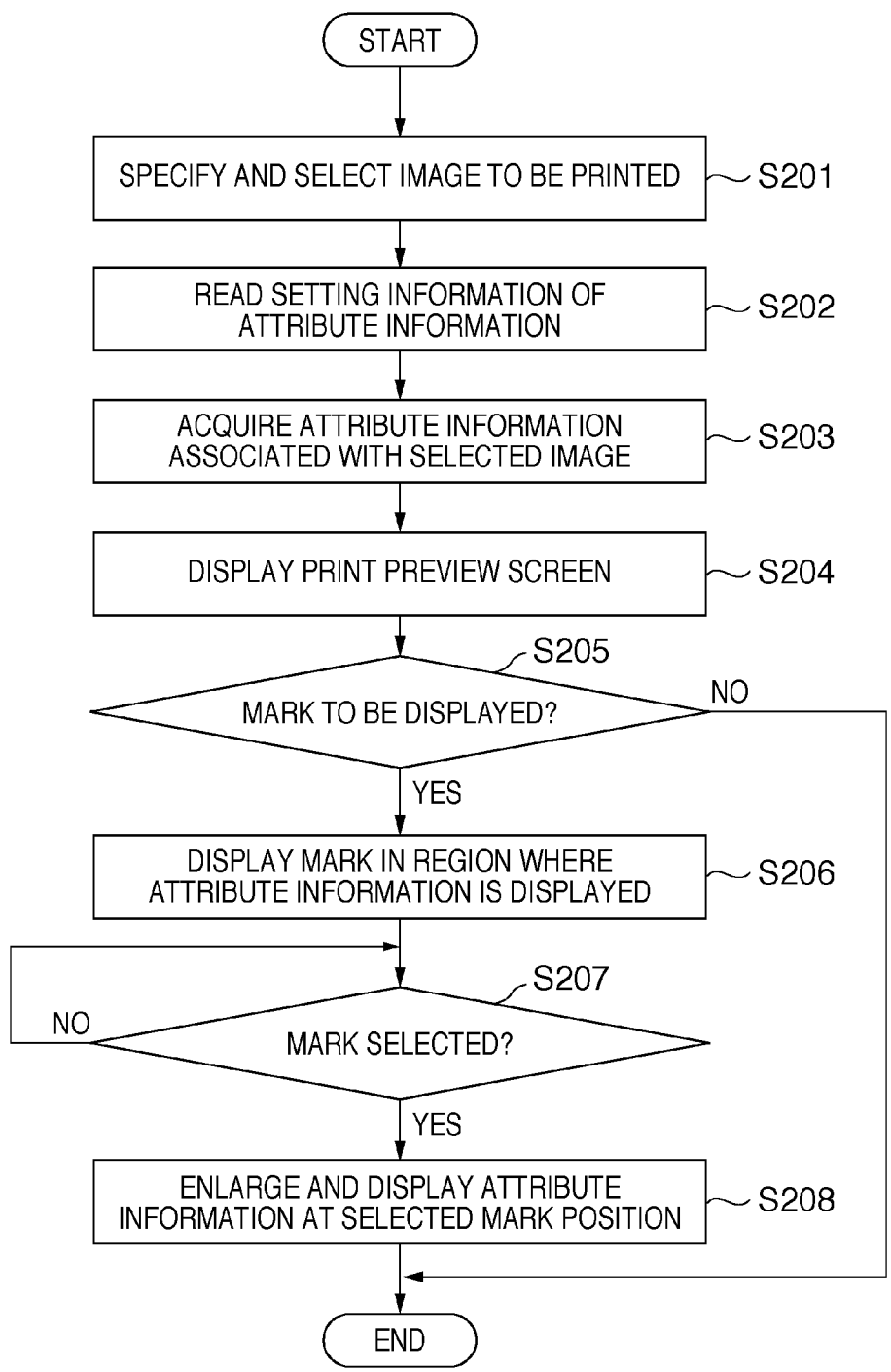
FIG. 6 is a flowchart exemplifying the sequence of processing when displaying a print preview screen.

FIG. 6 is a flowchart exemplifying the sequence of processing when displaying a print preview screen.

This processing starts when the operator selects an image to be printed by a mouse operation. Upon this operation, the information processing apparatus 10 causes the image selection unit 205 to specify the selected image (S201). At this time, a plurality of images may be selected.

After that, the information processing apparatus 10 causes the setting information acquisition unit 204 to read setting information managed by the setting information management unit 201 (S202). The information processing apparatus 10 causes the image information acquisition unit 203 to acquire attribute information associated with the image specified in S201 (S203). The attribute information is acquired from the setting information read in S202.

The information processing apparatus 10 causes the preview display processing unit 206 to display a print preview screen (S204). More specifically, the display unit 109 displays a screen on which the attribute information acquired in S203 is arranged on the image selected in S201.

The information processing apparatus 10 causes the mark display determination unit 207 to determine whether to display a mark. More specifically, when the display region contains at least one item to display an attribute, the mark display determination unit 207 determines to display a mark. When the display region does not contain even one display item, the mark display determination unit 207 determines not to display a mark. For example, when an attribute information setting is made to display the patient ID and patient name in an upper left region, the mark display determination unit 207 determines to display a mark in the upper left region.

If it is determined not to display a mark (NO in S205), the process ends. If it is determined to display a mark (YES in S205), the information processing apparatus 10 causes the mark display processing unit 208 to display a mark in a region having at least one attribute information display setting (S206).

The information processing apparatus 10 waits until the mark selection determination unit 209 determines that the operator has selected the displayed mark by a mouse operation (NO in S207). The information processing apparatus 10 keeps waiting while the print preview screen is displayed. The mark is selected by, for example, detecting that the operator has pointed the mouse cursor onto the displayed mark. The mark may be selected by a means other than the mouse. For example, it is possible that a numeric key is made in advance to correspond to a mark position, and typing a numeric key is detected to determine that a corresponding mark has been selected. When the display unit 109 is formed from a touch panel, a region touched with a finger or the like may be detected to determine that a corresponding mark has been selected.

If the mark selection determination unit 209 determines in S207 that the operator has selected the mark (YES in S207), the information processing apparatus 10 causes the attribute information display processing unit 210 to display attribute information corresponding to the selected mark position in a form different from the print preview screen. For example, as described with reference to FIG. 5, when the operator points the cursor to the mark, a small window appears, like an attribute information-written tool chip (S208).

As described above, according to the first embodiment, a mark is arranged on the print preview screen to represent the presence/absence of an attribute information setting. When the operator selects the mark with the cursor, the contents of the attribute information are enlarged and displayed. The operator can easily confirm attribute information added to an image, together with the print image of the entire image. The first embodiment can improve operability.

(Second Embodiment)

The second embodiment will be described. In the second embodiment, attribute information is displayed on a print preview screen at the same size as that in actual printing. That is, when attribute information is printed at a height of 1 cm and a width of 5 cm on a printing medium (e.g., film), it is also displayed at the height of 1 cm and the width of 5 cm on a monitor (a display unit 109). The arrangement of an information processing apparatus 10 in the second embodiment is basically the same as that in the first embodiment, and a description thereof will not be repeated.

The display size on the display unit 109 is calculated by $$\text{pixel count on the monitor(display unit 109)} = \text{print pixel count} \times \text{printer(printing unit 100)pixel pitch/monitor(display unit 109)resolution} \quad (1)$$

That is, the display size is determined based on the print performance (print pixel count) of the printing unit 100 and the display performance (resolution) of the display unit 109. In the display, a window displayed by an attribute information display processing unit 210 functions as a magnifier. The window is desirably displayed at a minimum one of sizes capable of displaying all items of attribute information at once.

FIG. 7 is a view exemplifying a print preview screen according to the second embodiment.

A print preview screen 700 corresponds to the screen 600 shown in FIG. 5 in the first embodiment. Reference numeral 701 denotes an attribute information display form according to the second embodiment. Attribute information is displayed on the display unit 109 at a size including both text information and an image in a region to be printed.

FIG. 8 is a flowchart exemplifying the sequence of display size determination processing when displaying attribute information. The operation of the information processing apparatus 10 is the same as that described with reference to FIGS. 4 and 6 in the first embodiment. Hence, only a difference from the first embodiment will be explained. The difference is processing in S207 of FIG. 6, that is, a display form to display attribute information.

The information processing apparatus 10 calculates an attribute information display region on an image (S301). This display region is calculated based on attribute information acquired by pre-processing and the font size used for the display. The calculated display region has a size including at least all items of attribute information. The display region desirably contains small, top, bottom, left, and right margins.

The information processing apparatus 10 composites (overlays) the character string of attribute information and the image, creating a print image (S302). The information processing apparatus 10 acquires the pixel pitch of the printing unit 100. The pixel pitch is that of a printer used to print. For example, the pixel pitch of a medical printer (DICOM printer) is often described on a DICOM conformance statement. For example, the operator registers the pixel pitch in advance.

The information processing apparatus 10 acquires the resolution of the display unit 109 (S304), and calculates a pixel size for actual display on the display unit 109 (S305). This processing is done according to equation (1) described above. Assume that the pixel count of the attribute display region of the print image calculated in S302 is 200×400 pixels, the pixel pitch of the printing unit 100 is 80 µm, and the resolution of the display unit 109 is 96 dpi. In this case, the actual print size is 1.6 cm (200×80 µm)×3.2 cm (400×80 µm). The pixel count for display on the display unit 109 at this size is the product of 1.6×96/2.54=60 pixels and 3.2×96/2.54=120 pixels.

Thereafter, the information processing apparatus 10 enlarges/reduces the print image to the pixel count calculated in S305, creating a display image (S306). In this example, data of the print image is enlarged 0.3 times from 200 pixels× 400 pixels to 60 pixels×120 pixels. The information processing apparatus 10 then displays attribute information (S307).

As described above, according to the second embodiment, attribute information is displayed on the print preview screen at an actual print size. The operator can confirm attribute information at an actual print size. This can prevent problems such as an excessively small font of attribute information upon printing. The user need not print again, reducing waste of a printing medium (e.g., film).

(Third Embodiment)

The third embodiment will be described. In the third embodiment, a plurality of attribute information arranged in a plurality of portion on screen are enlarged and displayed not one by one but at once. That is, attribute information need not always be enlarged and displayed at only one specific portion. For example, when a plurality of images are displayed on the print preview screen and the operator selects a given mark, attribute information of the same type as that corresponding to the mark may be enlarged and displayed simultaneously in all images. The arrangement and operation of an information processing apparatus 10 in the third embodiment are basically the same as those in the first embodiment, and a description thereof will not be repeated.

FIG. 9 is a view exemplifying a print preview screen according to the third embodiment.

Reference numeral 900 denotes a print preview screen. A mouse cursor 902 points an upper right mark position on an image 903, so attribute information 901 is enlarged and displayed. At the same time, attribute information in an upper right region on an image 904 is also enlarged and displayed. That is, when the mark of the upper right region on the right image is pointed, attribute information corresponding to the mark and attribute information corresponding to the mark of the upper right region on the left image are enlarged simultaneously. Needless to say, all attribute information may be enlarged and displayed at once, instead of simultaneously enlarging and displaying only attribute information in corresponding regions in the two images. Also when three or more images are to be printed, this processing can be executed for attribute information added to the respective images displayed on the print preview screen.

As described above, the third embodiment can obviate the need to point the marks of respective images one by one when printing a plurality of images. The operator can confirm a plurality of attribute information at once, and the third embodiment further improves operability.

Typical embodiments of the present invention have been described above. However, the present invention is not limited to the aforementioned and illustrated embodiments, and can be properly modified without departing from the scope of the invention. For example, the present invention may be practiced by partially or entirely combining the first to third embodiments.

Although the embodiments have not mentioned processing to cancel enlargement of attribute information enlarged and displayed on the print preview screen, the processing can be executed at any timing. For example, enlargement may be canceled soon if no mark is selected with a cursor or the like, or upon the lapse of a predetermined time.

The present invention can adopt embodiments of a system, apparatus, method, program, storage medium, and the like. More specifically, the present invention is applicable to a system formed from a plurality of devices or an apparatus formed from one device.

The present invention provides a display which allows an operator to easily confirm the contents of attribute information added to an image, together with the print image of the entire image (high resolution).

(Other Embodiments)

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-256643 filed on Oct. 1, 2008, which is hereby incorporated by reference herein in its entirety.

What is claimed is:

1. An information processing apparatus which displays a medical X-ray image and attribute information of the medical X-ray image on a screen of on a display device, the apparatus comprising:
    a setting unit configured to set, on a medical X-ray image to be printed, a print position of attribute information of the medical X-ray image;
    a preview display processing unit configured to display, on the display device, a print preview screen generated by reducing both the medical X-ray image to be printed on which the attribute information is arranged at the print position set by said setting unit and the attribute information; and
    an attribute information display processing unit configured to enlarge and display only the attribute information in a case where a region corresponding to a corner portion of a display region of the attribute information on the print preview screen displayed on the display device by said preview display processing unit is selected.

2. The apparatus according to claim 1, further comprising a mark display processing unit configured to display a mark in correspondence with the attribute information on the print preview screen displayed on the display device,
    wherein said attribute information display processing unit enlarges and displays attribute information corresponding to the mark in a case where the mark displayed by said mark display processing unit is selected.

3. The apparatus according to claim 2, wherein
    the attribute information includes at least one item, and
    said attribute information display processing unit enlarges and displays all the items of attribute information corresponding to the mark displayed by said mark display processing unit by using a separate window of a size capable of simultaneously displaying all the items of attribute information.

4. The apparatus according to claim 1, wherein said attribute information display processing unit enlarges and displays the attribute information in accordance with printing size of the attribute information by a printing apparatus, based on print performance of the printing apparatus used to print and display performance of the display device.

5. The apparatus according to claim 1, wherein, in a case where a plurality of medical X-ray images to be printed are displayed on the print preview screen and attribute information of one of the medical X-ray images is selected, said attribute information display processing unit enlarges and displays the selected attribute information, and attribute information displayed at identical positions on remaining medical X-ray images.

6. The apparatus according to claim 1, wherein the medical X-ray image to be printed is higher in resolution than the image forming the attribute information.

7. A display method for an information processing apparatus which displays a medical X-ray image and attribute information of the medical X-ray image on a screen of a display device, the method comprising:
    setting, on a medical X-ray image to be printed, a print position of attribute information of the medical X-ray image;
    displaying, on the display device, a print preview screen generated by reducing both the medical X-ray image to be printed on which the attribute information is arranged at the print position set in said setting step and the attribute information; and
    enlarging and displaying only the attribute information in a case where a region corresponding to a corner portion of a display region of the attribute information on the print preview screen displayed on the display device in said displaying step is selected.

8. A non-transitory computer-readable storage medium storing a computer program for causing a computer incorporated in an information processing apparatus which displays a medical X-ray image and attribute information of the medical X-ray image on a screen of a display device, to function as
    a setting unit configured to set, on a medical X-ray image to be printed, a print position of attribute information of the medical X-ray image,
    a preview display processing unit configured to display, on the display device, a print preview screen generated by reducing both the medical X-ray image to be printed on which the attribute information is arranged at the print position set by said setting unit and the attribute information, and
    an attribute information display processing unit configured to enlarge and display only the attribute information in a case where a region corresponding to a corner portion of a display region of the attribute information on the print preview screen displayed on the display device by said preview display processing unit is selected.

* * * * *